United States Patent
Yu et al.

(10) Patent No.: US 8,837,081 B1
(45) Date of Patent: Sep. 16, 2014

(54) LAMINATED TOUCHDOWN SENSOR FOR HARD DISK DRIVES

(75) Inventors: Chengtao R. Yu, Mountain House, CA (US); Dehua Han, Fremont, CA (US); Ying Hong, Morgan Hill, CA (US); Feng Liu, San Ramon, CA (US); Laurence L. Chen, Hayward, CA (US); Zhanjie Li, Pleasanton, CA (US); Zhigang Bai, Milpitas, CA (US); Yu Lo, Foster City, CA (US); Yunfei Ding, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 38 days.

(21) Appl. No.: 13/312,107

(22) Filed: Dec. 6, 2011

(51) Int. Cl.
*G11B 5/127* (2006.01)

(52) U.S. Cl.
USPC ............... 360/110; 360/125.71; 360/125.72

(58) Field of Classification Search
USPC ................................ 360/110, 125.71–125.72
See application file for complete search history.

(56) References Cited

U.S. PATENT DOCUMENTS

| | | | |
|---|---|---|---|
| 6,097,559 A | 8/2000 | Ottesen et al. | |
| 6,196,062 B1 | 3/2001 | Wright et al. | |
| 6,452,735 B1 | 9/2002 | Egan et al. | |
| 6,801,376 B2 | 10/2004 | Smith | |
| 6,822,814 B2 | 11/2004 | Ng et al. | |
| 6,980,383 B2 | 12/2005 | Brunnett et al. | |
| 7,068,457 B2 | 6/2006 | Riddering et al. | |
| 7,124,625 B1 | 10/2006 | Kurita et al. | |
| 7,324,313 B2 * | 1/2008 | Childress et al. | 360/324.12 |
| 7,423,830 B2 | 9/2008 | Ma et al. | |
| 7,796,356 B1 | 9/2010 | Fowler et al. | |
| 7,800,858 B1 | 9/2010 | Bajikar et al. | |
| 7,830,634 B2 | 11/2010 | Chen et al. | |
| 8,018,693 B2 * | 9/2011 | Yanagisawa | 360/324.12 |
| 2002/0097513 A1 | 7/2002 | Ng et al. | |
| 2005/0052793 A1 | 3/2005 | Hong et al. | |
| 2008/0042779 A1 * | 2/2008 | Carey et al. | 333/167 |
| 2008/0186621 A1 | 8/2008 | Partee | |
| 2008/0225426 A1 | 9/2008 | Roy et al. | |
| 2008/0273260 A1 | 11/2008 | Liu et al. | |
| 2010/0015477 A1 | 1/2010 | McGill | |
| 2010/0020439 A1 | 1/2010 | Watanabe | |
| 2010/0091416 A1 * | 4/2010 | Katada et al. | 360/324.11 |
| 2010/0177429 A1 | 7/2010 | Lee et al. | |
| 2010/0182723 A1 * | 7/2010 | Yanagisawa | 360/324.12 |
| 2012/0120527 A1 * | 5/2012 | Kunkel et al. | 360/235.4 |
| 2012/0262816 A1 * | 10/2012 | Tanaka et al. | 360/59 |

\* cited by examiner

*Primary Examiner* — Wayne Young
*Assistant Examiner* — Carlos E Garcia

(57) ABSTRACT

A method and system provide a touchdown sensor for use in disk drive. The touchdown sensor includes a sensor layer including a plurality of magnetic layers interleaved with at least one nonmagnetic layer. The plurality of magnetic layers are magnetically coupled and single domain. Further, the sensor has a temperature coefficient of resistivity (TCR) of at least 0.15%/° C.

19 Claims, 5 Drawing Sheets

US 8,837,081 B1

LAMINATED TOUCHDOWN SENSOR FOR HARD DISK DRIVES

BACKGROUND

Disk drives typically use heads residing on sliders to read from and write to the magnetic media. Read and write transducers residing in the head are flown at a small, controlled spacing above the magnetic medium during read and write operations. Although generally desired to operate in close proximity to but not touching the disk, the head may also contact the media. This prolonged contact, for example on the order of tens of microseconds or more, is known as touchdown. For example, heads typically use a thermal actuator that generates heat to control the head-media spacing. Heat generated by the thermal actuator causes local thermal expansion of the head, which locally reduces the spacing between the head and magnetic media. The thermal actuator can be driven to induce sufficient heating for contact between the head and media, or touchdown. This touchdown is intentional and is generally performed on each drive during initial drive calibration. Touchdown may also occur at other times during disk drive operation, for example due to changes in environmental conditions, operation of the disk drive outside of desired parameters, or contamination to the head that causes the prolonged contact described above.

Touchdown is detected in the drive operation as well as in testing. Conventional touchdown detection may be performed using a variety of techniques. For example, touchdown sensors consisting of a single layer of NiFe has been used. NiFe typically has a relatively large temperature coefficient of resistivity (TCR). The change in resistivity of a NiFe film with temperature may thus be relatively high. As the disk drive experiences touchdown, the temperature of the NiFe sensor changes. For example, a 0.1 degree Celsius change in temperature may abruptly occur upon touchdown. The change in temperature changes the resistivity of the NiFe sensor. Using this jump in resistivity of the NiFe sensor, touchdown might be detected.

Although such conventional methods for detecting touchdown function, there are drawbacks. The NiFe sensor may erase the media. The NiFe layer in the touchdown sensor may have multiple domains. Under the influence of a small external field, the domain wall(s) between domains may move. The movement of the domain wall or domain wall nucleation results in stray fields. These stray fields may result in unexpected erasure of the media. Further, the NiFe layer in the touchdown sensor is magnetic. As a result, the NiFe layer may have stray fields at its ends. The stray fields may result in adjacent track erasure, or wide area track erasure (WATER), which is undesirable.

Accordingly, what is needed is a system and method for providing improved touchdown detection.

BRIEF SUMMARY OF THE INVENTION

A method and system for providing a touchdown sensor for use in disk drive. The touchdown sensor includes a sensor layer including a plurality of magnetic layers interleaved with at least one nonmagnetic layer. The plurality of magnetic layers are magnetically coupled and single domain. Further, the sensor has a temperature coefficient of resistivity (TCR) of at least 0.15%/° C.

DETAILED DESCRIPTION OF THE PREFERRED EMBODIMENTS

Figure 1:
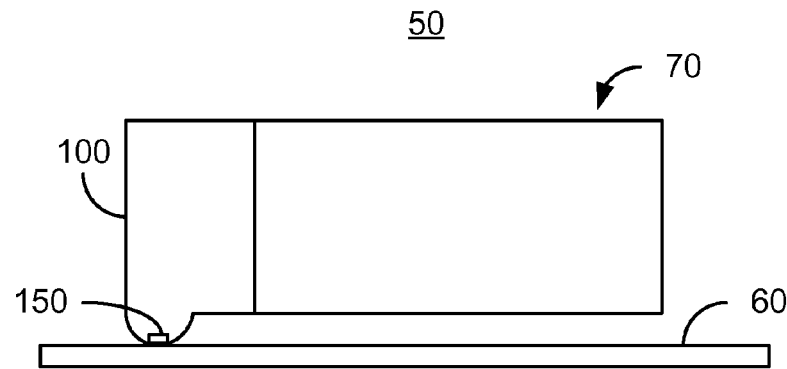
FIG. 1 is a diagram of a portion of an exemplary embodiment of a disk drive including a touchdown sensor.

FIG. 1 is a diagram of a portion of an exemplary embodiment of a disk drive 50, which may employ a touchdown sensor. For simplicity, components are omitted. In addition, for clarity, FIG. 1 is not drawn to scale. The disk drive 50 includes a media 60 and a slider 70. On the slider 70 resides head 100, which includes a touchdown sensor 150. The touchdown sensor 150 is a thermal sensor and, in one embodiment, is a thermistor.

The disk drive 50 is shown at touchdown. Consequently, the head 100 contacts the media 60 in the region of the touchdown sensor 150. The touchdown sensor 150 detects touchdown based upon the local temperature of the head 100. In particular, frictional heating due to contact between the media 60 and head 100 raises the temperature of the head 100 in the region proximate to where touchdown occurs. Furthermore, the head 100 typically vibrates during touchdown, which may cause an oscillation in temperature. The touchdown sensor 150 is located in this touchdown region. Thus, the touchdown sensor 150 is able to detect temperature changes due to contact between the head 100 and disk 60.

Figure 2:
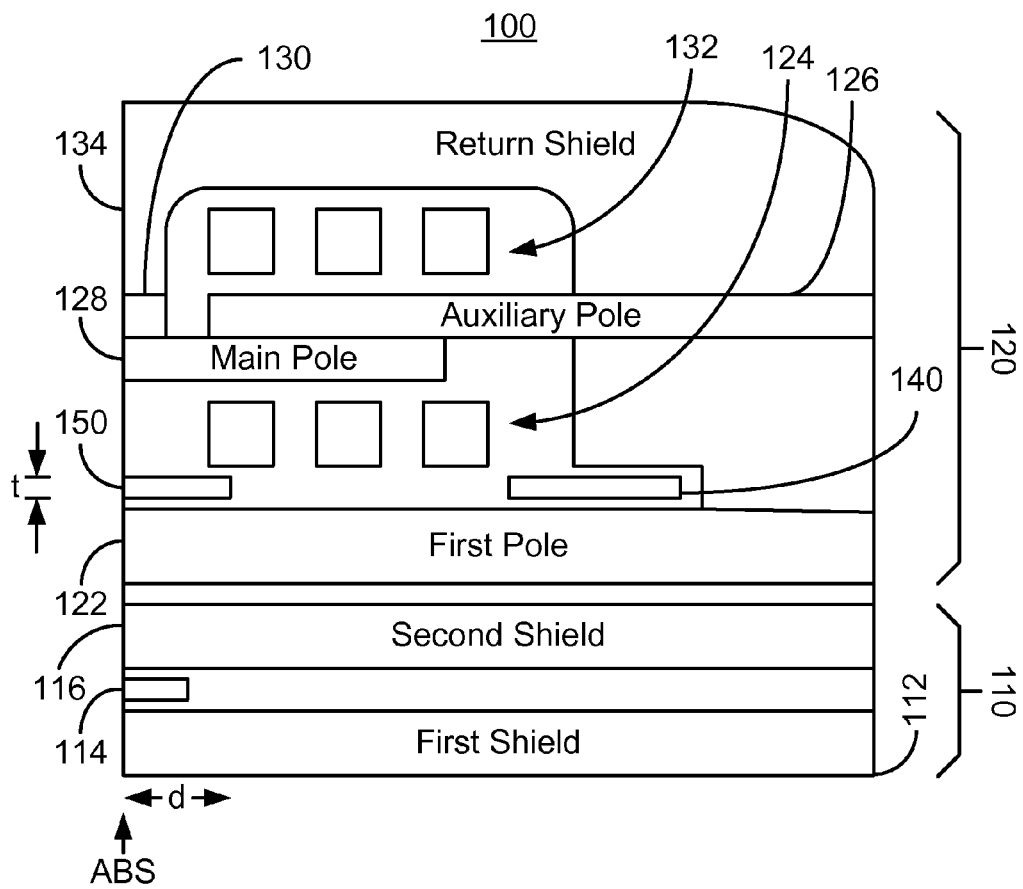
FIG. 2 depicts an exemplary embodiment of a head having a transducer including an integrated touchdown sensor.

FIG. 2 depicts an exemplary embodiment of a portion of the magnetic head 100. For simplicity, components of the head 100 are omitted and the media 60 is not shown in FIG. 2. In addition, for clarity, FIG. 2 is not drawn to scale. The magnetic head 100 includes a magnetic read transducer 110 and write transducer 120. Referring to FIGS. 1-2, the head 100 may reside on the slider 70 of a disk drive 50. The head 100 is also described in the context of particular components and layers. However, in some embodiments, such layers may include sub-layer(s). In addition, some components may be moved, omitted, or combined with other components.

The read transducer 100 is used in reading from the media 60. The read transducer 110 includes shields 112 and 116 and sensor 114. The read sensor 114 may include a giant magnetoresistive sensor, such as a tunneling magnetoresistive junction. However, in other embodiments, the read sensor 114 may include other and/or additional components.

The write transducer 120 is used in writing to the media 60. The write transducer 140 is shown as including a first pole 122, auxiliary pole 126, main pole 128, write gap 130, coils 124 and 132, and return shield 134. However, in another embodiment, the write transducer 120 other and/or different components. For example, in other embodiments, the write transducer 120 may be an energy assisted magnetic recording (EAMR) transducer including optics for directing light energy toward a media for heating. In addition, one or more portions of the write transducer 120 might be omitted in various embodiments. The first pole 122 is shown as separate from shield 116. However, in another embodiment, the second shield 116 and first pole 122 may be combined.

The head 100 may also include thermal actuator 140 and touchdown sensor 150. Although the thermal actuator 140 and touchdown sensor 150 are shown at particular locations in FIGS. 1 and 2, in other embodiments, these components 140 and 150 may be located elsewhere. The thermal actuator 140 may be used to induce touchdown, as shown in FIG. 1, and otherwise control the spacing of the head 100 to the media 60. For example, a current may be driven through the thermal actuator 140, which generates heat in the region of the transducers 110 and 120. As a result, the transducers 120 and/or 110 may bulge outward toward the media 60, as shown in FIG. 1. When enough heat is generated by the thermal actuator 140, sufficient thermal protrusion occurs for intentional touchdown. However, in other embodiments, the thermal actuator 140 might be omitted.

The head 100 also includes a touchdown sensor 150, which is used to detect touchdown of the head 100 on the media 60. In the embodiment shown, the touchdown sensor 150 is located near the first pole 122. However, in other embodiments, the touchdown sensor 150 may be located elsewhere or may be used in another manner. The touchdown sensor 150 is used to sense touchdown due to thermal changes in the head 100. This touchdown may be intentional, as caused by the thermal actuator 140 or other analogous mechanism. In some embodiments, inadvertent touchdown may also be detected. Once touchdown is detected using the touchdown sensor 150, the thermal actuator 140 may be driven at a lower power in order to ensure that there is a desired space between the head 100 and media 60. Thus, the fly height of the head 100 may be selected and controlled.

In the embodiment shown, the touchdown sensor 150 is a temperature sensor. In operation, the touchdown sensor 150 senses the changes in temperature of the transducer 120 due to heat generated by the thermal actuator 140 and other components of the head 100. Upon touchdown, contact between the head 100 and media 60 can cause sharp changes, or jumps, in the temperature of the head 150. The temperature changes persist during touchdown. The temperature sensor 150 is capable of detecting theses relatively abrupt changes in temperature.

In the embodiment shown in FIGS. 1-2, the touchdown sensor 150 is exposed to the air-bearing surface (ABS). However, in another embodiment, the touchdown sensor 150 may be recessed from the ABS. The touchdown sensor 150 is, however, desired to be sufficiently close to the ABS to detect temperature changes due to touchdown. For example, in one embodiment, the touchdown sensor 150 may be not more than ten to one hundred nanometers from the ABS. In addition, the touchdown sensor is also desired to be exposed to the same environment as the transducers 110 and 120, including heat from the thermal actuator 140.

Figure 3:
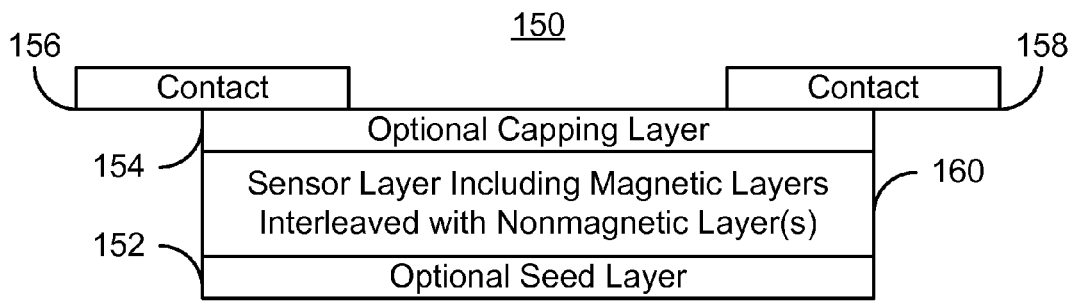
FIG. 3 depicts a side view of an exemplary embodiment of a touchdown sensor that may be used in a head/disk drive.

FIG. 3 depicts an exemplary embodiment of a touchdown sensor 150 used in the head 100 depicted in FIGS. 1-2. For simplicity, FIG. 3 is not to scale. In addition to the actual sensor 150, contacts 156 and 158 are also shown. The contacts 156 and 158 may be metallic, for example composed of Ru. The contacts 156 and 158 may be used to drive current through the sensor 150, as well as read the resistance and thus temperature from the sensor 150. The contacts 156 and 158 are shown as both above the temperature sensor 150. However, in other embodiments, the contacts 156 and 158 may be located elsewhere. Although shown as a simple, rectangular layer, the sensor 150 may have another shape that may depend upon the underlying topology.

The sensor 150 may include three layers—an optional seed layer 152, a sensor layer 160, and an optional capping layer 154. Although depicted as simple layers, the seed layer 152 and/or the capping layer 154 may be a multilayer. The seed layer 152 and/or capping layer 156 may each include at least one of Ta, Ru, Ti, NiNb, and NiCr. However, in other embodiments, other material(s) may be used. The sensor layer 160 is a multilayer including magnetic layers interleaved with at least one nonmagnetic layer. For example, if two magnetic layers are used, a single nonmagnetic layer may be between the two magnetic layers. If three magnetic layers are used, two nonmagnetic layers are present. One nonmagnetic layer is between the first and second magnetic layers. The other nonmagnetic layer is between the second and third magnetic layers. In some embodiments, the nonmagnetic layer(s) are insulating, such as aluminum oxide. In other embodiments, the nonmagnetic layer(s) are conductors, such as Ru. In some embodiments, additional magnetic layers, such as CoFe, may sandwich each of the nonmagnetic layers.

The magnetic layers in the sensor layer 160 are magnetically coupled and single domain. In some embodiments, the magnetic layers are ferromagnetically aligned, while in other embodiments, the magnetic layers are antiferromagnetically aligned. The alignment depends upon the coupling between the magnetic layers. In some embodiments, the coupling depends upon distance between the magnetic layers and thus the thickness of the nonmagnetic layer(s). In some embodiments, the magnetic layers include at least one of Ni, Co, NiFe, NiFeCr, CoNiFe, and CoFe. In addition, the sensor 150 as a whole has a temperature coefficient of resistivity (TCR) of at least $0.15\%/^\circ$ C. In some embodiments, the temperature coefficient of resistivity is at least $0.3\%/^\circ$ C.

The touchdown sensor 150 may have improved performance. Because the magnetic layers of the sensor layer 160 are magnetically coupled, they are single domain. Thus, inadvertent erasure of the media to domain wall motion and domain nucleation in the sensor 160 may be reduced or eliminated. In addition, in embodiments for which the magnetic layers are antiferromagnetically aligned, the stray magnetic fields from the ends of the layer may also be reduced. Thus, the issues of adjacent track interference and/or wide area track erasure may be reduced or eliminated.

Figure 4:
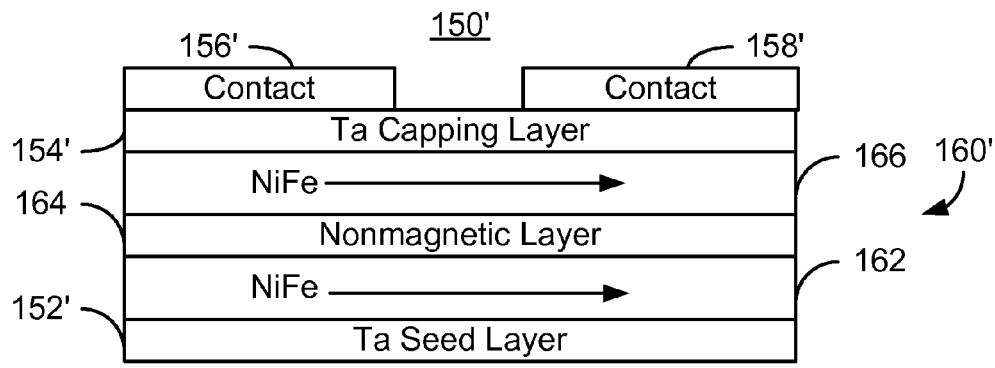
FIGS. 4-5 depict side and plan views of an exemplary embodiment of a touchdown sensor that may be used in a head/disk drive.
Figure 5:
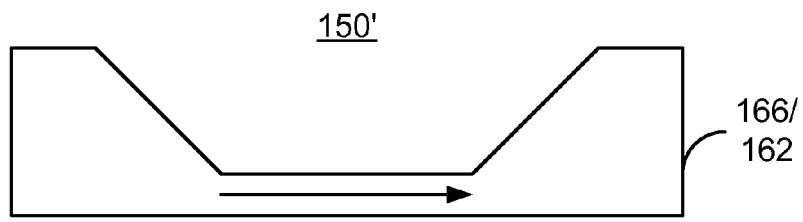

FIGS. 4-5 depict side and plan views of an exemplary embodiment of a touchdown sensor 150' used in the head 100 depicted in FIGS. 1-2 and as the touchdown sensor 150 depicted in FIG. 3. For simplicity, FIGS. 4-5 are not to scale. The touchdown sensor 150' is analogous to the touchdown sensor 150. Consequently, analogous components are labeled similarly. The touchdown sensor 150' thus includes seed layer 152', sensor layer 160', and capping layer 154' that are analogous to layers 152, 160, and 154, respectively. In addition, contacts 156' and 158' analogous to contacts 156 and 158, respectively, are also shown. Although shown as a simple, rectangular layer, the sensor 150' may have another shape that may depend upon the underlying topology. Further, in the embodiment shown, the optional seed layer 152' and optional capping layer 154' are Ta layers. However, in other embodiments, other seed and/or capping layers may be used.

The sensor layer 160' is a multilayer including magnetic layers 162 and 166 interleaved with a nonmagnetic layer 164. Thus, in the embodiment shown, the sensor layer 160' includes two magnetic layers 162 and 166 and one nonmagnetic layer 164. In another embodiment, more nonmagnetic layers and more magnetic layers may be used. In some embodiments, the nonmagnetic layer 164 is an insulator, such as aluminum oxide. For example, in some embodiments, an aluminum oxide nonmagnetic layer 164 may have a thickness of approximately 0.8 nm through 2 nanometers for ferromagnetic coupling of the layers 162 and 166. In other embodiments, the nonmagnetic layer 164 is a conductor, such as Ru. Selecting the desired thickness of the nonmagnetic layer 164 may provide the ferromagnetic coupling.

Also in the embodiment shown, the layers 162 and 166 are ferromagnetically coupled. Thus, the magnetizations of the magnetic layers 162 and 166 are aligned. The magnetic layers 162 and 166 are also single domain. In some embodiments, magnetic layers such as CoFe (not shown) may sandwich each of the nonmagnetic layers. In some embodiments, the magnetic layers 162 and 164 include at least one of Ni, Co, NiFe, NiFeCr, CoNiFe, and CoFe. In addition, the sensor 150' has a temperature coefficient of resistivity (TCR) of at least 0.15%/° C. In some embodiments, the temperature coefficient of resistivity is at least 0.3%/° C.

The touchdown sensor 150' may share at least some of the benefits of the touchdown sensor 150. Because the magnetic layers 162 and 166 of the sensor layer 160' are magnetically coupled, they are single domain. Thus, inadvertent erasure of the media due to domain wall motion in the sensor 160' may be reduced or eliminated.

Figure 6:
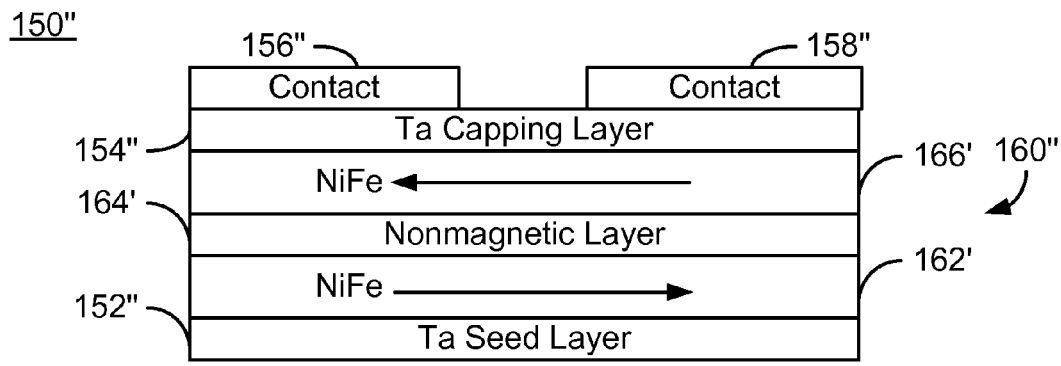
FIGS. 6-7 depict side and plan views of another exemplary embodiment of a touchdown sensor that may be used in a head/disk drive.
Figure 7:
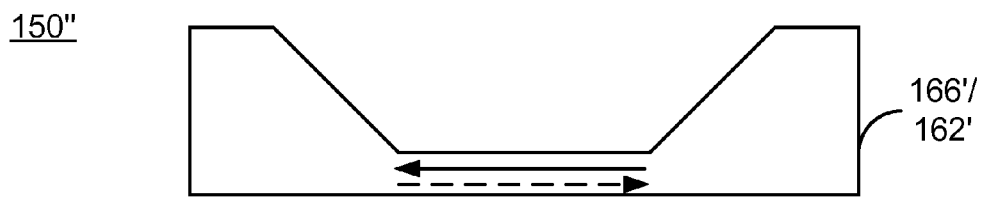

FIGS. 6-7 depict side and plan views of an exemplary embodiment of a touchdown sensor 150" used in the head 100 depicted in FIGS. 1-2 and as the touchdown sensors 150 and 150' depicted in FIGS. 3-5. For simplicity, FIGS. 6-7 are not to scale. The touchdown sensor 150" is analogous to the touchdown sensor 150 and 150'. Consequently, analogous components are labeled similarly. The touchdown sensor 150" thus includes an optional seed layer 152", sensor layer 160", and optional capping layer 154" that are analogous to layers 152/152', 160/160', and 154/154', respectively. In addition, contacts 156" and 158" analogous to contacts 156/156' and 158/158', respectively, are also shown. Although shown as a simple, rectangular layer in FIG. 6, the sensor 150" may have another shape that may depend upon the underlying topology. Further, in the embodiment shown, the optional seed layer 152" and capping layer 154" are Ta layers. However, in other embodiments, other seed and/or capping layers may be used.

The sensor layer 160" is a multilayer including magnetic layers 162' and 166' interleaved with a nonmagnetic layer 164'. Thus, in the embodiment shown, the sensor layer 160" includes two magnetic layers 162' and 166' and one nonmagnetic layer 164'. In another embodiment, more nonmagnetic layers and more magnetic layers may be used. In some embodiments, the nonmagnetic layer 164' is a conductor, such as Ru. For example, in some embodiments, an Ru nonmagnetic layer 164' may have a thickness of approximately 0.32 nm through 1 nanometer for antiferromagnetic coupling of the layers 162' and 166'. Selecting the desired thickness of the nonmagnetic layer 164' may provide the desired antiferromagnetic coupling.

Also in the embodiment shown, the layers 162' and 166' are antiferromagnetically coupled. Thus, the magnetizations of the magnetic layers 162' and 166' are antiparallel. The magnetic moment of the layer 162" is thus shown as a dashed arrow in FIG. 7. The magnetic layers 162' and 166' are also single domain. In some embodiments, magnetic layers such as CoFe (not shown) may sandwich each of the nonmagnetic layers. In some embodiments, the magnetic layers 162' and 164' include at least one of Ni, Co, NiFe, NiFeCr, CoNiFe, and CoFe. In addition, the sensor 150" has a temperature coefficient of resistivity (TCR) of at least 0.15%/° C. In some embodiments, the temperature coefficient of resistivity is at least 0.3%/° C.

The touchdown sensor 150" may share at least some of the benefits of the touchdown sensors 150 and 150'. Because the magnetic layers 162' and 166' of the sensor layer 160" are magnetically coupled, they are single domain. Thus, inadvertent erasure of the media due to domain wall motion or nucleation in the sensor 160" may be reduced or eliminated. In addition, because the magnetic layers 162' and 166' are antiferromagnetically aligned, the stray magnetic fields from the ends of the sensor layer 160' may also be reduced. Thus, the issues of adjacent track interference and/or wide area track erasure may be reduced or eliminated.

Figure 8:
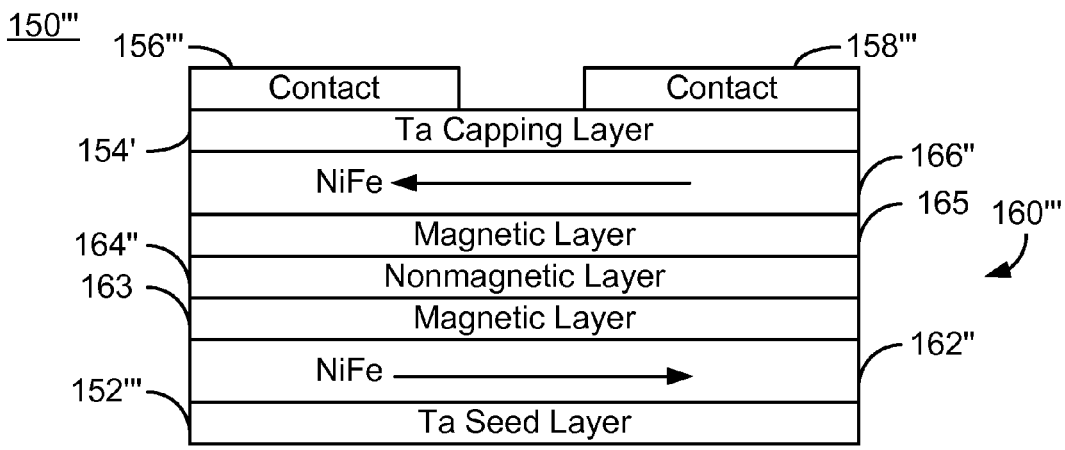
FIGS. 8-9 depict side and plan views of another exemplary embodiment of a touchdown sensor that may be used in a head/disk drive.
Figure 9:

FIGS. 8-9 depict side and plan views of an exemplary embodiment of a touchdown sensor 150''' used in the head 100 depicted in FIGS. 1-2 and as the touchdown sensors 150, 150', and 150" depicted in FIGS. 3-7. For simplicity, FIGS. 8-9 are not to scale. The touchdown sensor 150''' is analogous to the touchdown sensor 150, 150', and 150". Consequently, analogous components are labeled similarly. The touchdown sensor 150''' thus includes an optional seed layer 152''', sensor layer 160''', and optional capping layer 154''' that are analogous to layers 152/152'/152", 160/160'/160", and 154/154'/154", respectively. In addition, contacts 156''' and 158''' analogous to contacts 156/156'/156" and 158/158'/158", respectively, are also shown. Although shown as a simple, rectangular layer in FIG. 8, the sensor 150''' may have another shape that may depend upon the underlying topology. Further, in the embodiment shown, the optional seed layer 152''' and capping layer 154''' are Ta layers. However, in other embodiments, other seed and/or capping layers may be used.

The sensor layer 160''' is a multilayer including magnetic layers 162" and 166" interleaved with a nonmagnetic layer 164". Thus, in the embodiment shown, the sensor layer 160''' includes two magnetic layers 162" and 166" and one nonmagnetic layer 164" therebetween. In another embodiment, more nonmagnetic layers and more magnetic layers may be used. In some embodiments, the nonmagnetic layer 164' is a conductor, such as Ru. For example, in some embodiments, a Ru nonmagnetic layer 164' may have a thickness of approximately 0.8 nm nanometer for antiferromagnetic coupling of the layers 162" and 166". In other embodiments, for example embodiments in which the layers 162" and 166" are ferromagnetically coupled, the nonmagnetic layer 164" may be an insulator. Selecting the desired thickness of the nonmagnetic layer 164" may provide the desired magnetic coupling.

The sensor layer 160''' also includes magnetic layers 163 and 165 that sandwich the nonmagnetic layer 164". The magnetic layer 163 is thus between the magnetic layer 162" and the nonmagnetic layer 164". Similarly, the magnetic layer 165 is between the magnetic layer 166" and the nonmagnetic layer 164". In the embodiment shown, the magnetic layers 163 and 165 adjoin the nonmagnetic layer 164". The magnetic layers 163 and 165 may consist of materials such as CoFe. However in another embodiment, another material might be used for the magnetic layers 163 and/or 165.

In the embodiment shown, the layers 162" and 166" are antiferromagnetically coupled. Thus, the magnetizations of the magnetic layers 162" and 166" are antiparallel. The magnetic moment of the layer 162" is thus shown as a dashed arrow in FIG. 9. The magnetic layers 162" and 166" are also single domain. In some embodiments, the magnetic layers 162" and 164" include at least one of Ni, Co, NiFe, NiFeCr, CoNiFe, and CoFe. In addition, the sensor 150''' has a temperature coefficient of resistivity (TCR) of at least 0.15%/° C. In some embodiments, the temperature coefficient of resistivity is at least 0.3%/° C.

The touchdown sensor 150''' may share at least some of the benefits of the touchdown sensors 150, 150', and 150". Because the magnetic layers 162" and 166" of the sensor layer 160" are magnetically coupled, they are single domain. Further, the presence of the magnetic layers 163 and 165 may enhance the coupling between the magnetic layers 162 and 166 to ensure they remain single domain. Thus, inadvertent erasure of the media due to domain wall motion or nucleation in the sensor 160''' may be reduced or eliminated. In addition, because the magnetic layers 162" and 166" are antiferromagnetically aligned, the stray magnetic fields from the ends of the sensor layer 160''' may also be reduced. Thus, the issues of adjacent track interference and/or wide area track erasure may be reduced or eliminated.

Figure 10:
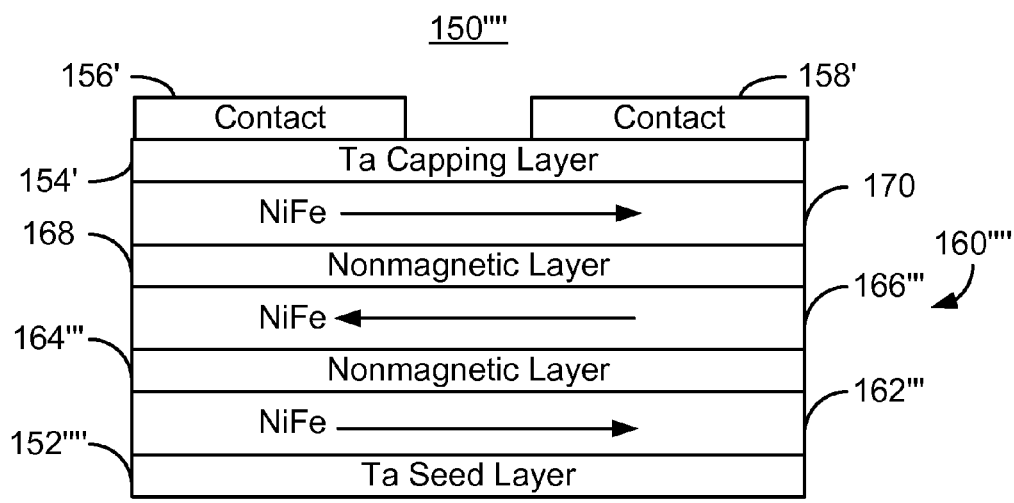
FIGS. 10-11 depict side and plan views of another exemplary embodiment of a touchdown sensor that may be used in a head/disk drive.
Figure 11:
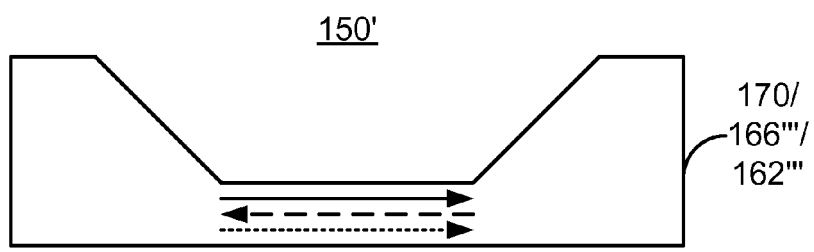

FIGS. 10-11 depict side and plan views of an exemplary embodiment of a touchdown sensor 150'''' used in the head 100 depicted in FIGS. 1-2 and as the touchdown sensors 150, 150', 150", and 150''' depicted in FIGS. 3-9. For simplicity, FIGS. 10-11 are not to scale. The touchdown sensor 150'''' is analogous to the touchdown sensor 150, 150', 150" and 150'''. Consequently, analogous components are labeled similarly. The touchdown sensor 150'''' thus includes an optional seed layer 152'''', sensor layer 160'''', and optional capping layer 154'''' that are analogous to layers 152/152'/152"/152''', 160/160'/160"/160''', and 154/154'/154"/154''', respectively. In addition, contacts 156'''' and 158'''' analogous to contacts 156/156'/156"/156''' and 158/158'/158"/158''', respectively, are also shown. Although shown as a simple, rectangular layer in FIG. 10, the sensor 150'''' may have another shape that may depend upon the underlying topology. Further, in the embodiment shown, the optional seed layer 152'''' and capping layer 154'''' are Ta layers. However, in other embodiments, other seed and/or capping layers may be used.

The sensor layer 160'''' includes an additional nonmagnetic layer 168 and an additional magnetic layer 170. Thus, the sensor layer 160'''' includes three magnetic layers 162", 166", and 170 interleaved with nonmagnetic layers 164''' and 168. In some embodiments analogous to the touchdown sensor 150''', additional magnetic layers may be provided between the magnetic layers 164''', 166''', and 170 and nonmagnetic layers 164''' and 168. In some embodiments, the nonmagnetic layers 164''' and 168 are conductors, such as Ru. For example, in some embodiments, Ru nonmagnetic layers 164" and 168 may each have a thickness of at least 0.32 to 1 nm nanometer for antiferromagnetic coupling of the layers 162''', 166''', and 170. In other embodiments, for example embodiments in which the layers 162''', 166''', and 170 are ferromagnetically coupled, the nonmagnetic layer 164" may be an insulator or conductor and may have different thicknesses. Selecting the desired thickness of the nonmagnetic layers 164''' and 170 may provide the desired magnetic coupling.

In the embodiment shown, the layers 162''', 166''', and 170 are antiferromagnetically coupled. Thus, the magnetizations of the magnetic layers 162''' and 166''' are antiparallel. The magnetizations of the magnetic layers 166''' and 170 are also antiparallel. The magnetic moments of the layers 162''' and 166''' are thus shown as dashed arrows in FIG. 11. The magnetic layers 162''', 166''', and 170 are also single domain. In some embodiments, the magnetic layers 162''', 164''', and 170 include at least one of Ni, Co, NiFe, NiFeCr, CoNiFe, and CoFe. In addition, the sensor 150'''' has a temperature coefficient of resistivity (TCR) of at least 0.15%/° C. In some embodiments, the temperature coefficient of resistivity is at least 0.3%/° C.

The touchdown sensor 150'''' may share at least some of the benefits of the touchdown sensors 150, 150', 150", and 150'''. Because the magnetic layers 162''', 166''', and 170 of the sensor layer 160" are magnetically coupled, they are single domain. Thus, unexpected erasure of the media due to domain wall motion or nucleation in the sensor 160'''' may be reduced or eliminated. In addition, because the magnetic layers 162''', 166''', and 170 are antiferromagnetically aligned, the stray magnetic fields from the ends of the sensor layer 160'''' may also be reduced. Thus, the issues of adjacent track interference and/or wide area track erasure may be reduced or eliminated.

Figure 12:
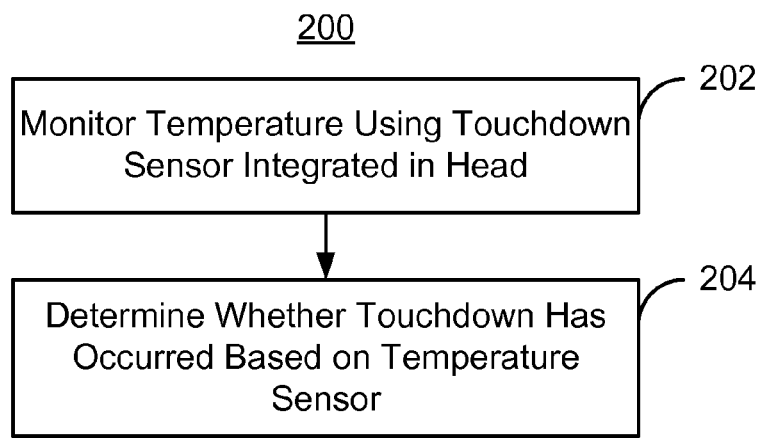
FIG. 12 is a flow chart depicting an exemplary embodiment of a method for detecting touchdown using a touchdown sensor integrated into a head.

FIG. 12 depicts an exemplary embodiment of a method 200 for detecting touchdown using a touchdown sensor integrated into a head. The method 200 is used in connection with the head 100 and touchdown sensor 150, 150', 150", 150''', and/or 150''''. Further, although depicted as a flow of single steps, the steps of the method 200 may be performed in parallel and/or continuously. In addition, the steps of the method 200 may include substeps and/or may be interleaved.

The temperature of the head 100 in the region of the ABS, near a region of the head 100 that touchdown occurs is monitored, via step 202. Step 202 may be performed continuously during calibration or operation of the head 100. It is determined whether touchdown has occurred based on the temperature(s) monitored by the temperature sensor 150/150'/150"/150'''/150'''', via step 204. Step 204 may be accomplished by determining whether the change in temperature of the touchdown sensor 150/150'/150"/150'''/150'''' has exceeded a particular amount. This may translate to determining whether the resistance of the touchdown sensor 150/150'/150"/150'''/150'''' has changed beyond a particular threshold. Thus, the touchdown sensor 150/150'/150"/150'''/150'''' may be used to detect touchdown. The ability to do so without adversely affecting the performance of other aspects of the disk drive 50 may be enhanced by use of the touchdown sensor 150/150'/150"/150'''/150''''.

Figure 13:
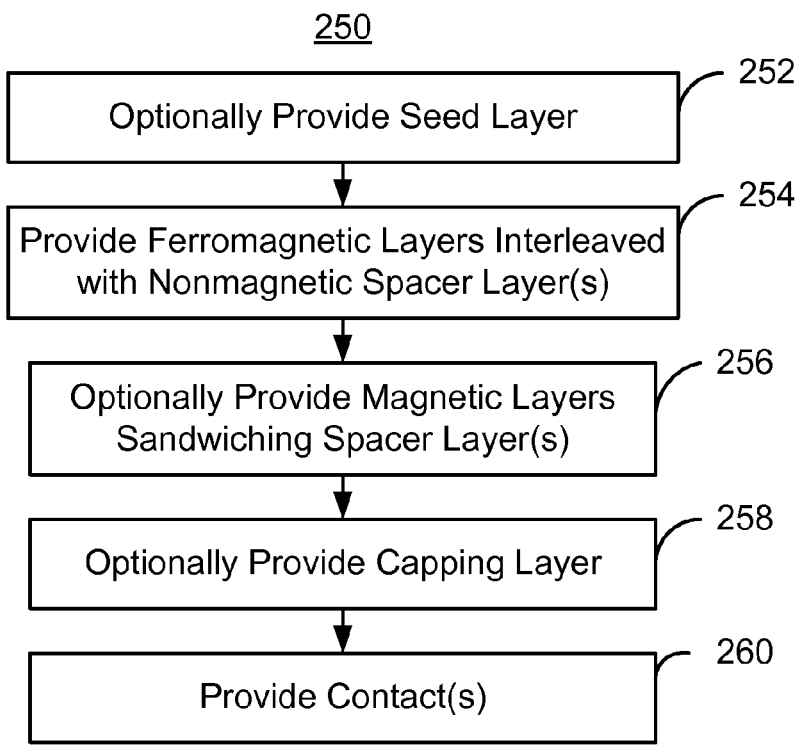
FIG. 13 is a flow chart depicting an exemplary embodiment of a method for providing a touchdown sensor.

FIG. 13 depicts an exemplary embodiment of a method 250 for providing a touchdown sensor. The method 250 is described in connection with the head 100 and touchdown sensors 150/150'/150"/150'''/150''''. Further, although depicted as a flow of single steps, the steps of the method 250 may be performed in parallel. The steps of the method 250 may include substeps and/or may be interleaved.

The seed layer 152/152'/152"/152'''/152'''' is optionally provided, via step 252. Step 252 may include depositing a layer and/or a multilayer including at least one of Ta, Ru, Ti, NiNb, and NiCr. The sensor layer 160/160'/160"/160'''/160'''' is deposited, via step 254. Step 254 may include sputtering or other mechanism for depositing the sensor layer 160/160'/160"/160'''/160''''. Step 254 includes alternately depositing magnetic layers and nonmagnetic layers between the magnetic layers. Additional magnetic layers, such as CoFe, sandwiching the nonmagnetic layers may optionally be deposited, via step 256. Note that steps 254 and 256 are generally interleaved as the stack for the sensor layer 160/160'/160"/160'''/160'''' is typically deposited from bottom to top. The capping layer 154/154'/154"/154'''/154'''' may also be provided, via step 258. The contacts 156/156'/156"/156'''/156'''' and 158/158'/158"/158'''/158'''' are provided, via step 160. Note that if contacts 156/156'/156"/156'''/156'''' and 158/158'/158"/158'''/158'''' are not located as shown in the drawings, part of step 260 may be performed before step 254 so that the contact 156/156'/156"/156'''/156'''' and/or 158/158'/158"/158'''/158'''' are below the touchdown sensor 150/150'/150"/150'''/150''''. Step 260 may include deposition and patterning of conductive layers to form contacts.

Using the method 250 the temperature sensor 150/150'/150"/150'"/150"" may be fabricated in a head. As a result, the benefits of the touchdown sensor 150/150'/150"/115'"/150"" may be achieved.

We claim:

1. A touchdown sensor comprising:
   a sensor layer within the touchdown sensor, the sensor layer including a plurality of magnetic layers interleaved with at least one nonmagnetic layer, the plurality of magnetic layers having a plurality of magnetic moments that are magnetically coupled, are single domain, and have a fixed relative orientation;
   wherein the sensor layer has a temperature coefficient of resistivity (TCR) of at least 0.15%/° C.

2. The touchdown sensor of claim 1 wherein the plurality of magnetic layers are ferromagnetically coupled.

3. The touchdown sensor of claim 1 wherein the plurality of magnetic layers are antiferromagnetically coupled.

4. The touchdown sensor of claim 1 wherein the sensor layer further includes an additional plurality of magnetic layers sandwiching each of the at least one nonmagnetic layer.

5. The touchdown sensor of claim 4 wherein the additional plurality of magnetic layers include CoFe.

6. The touchdown sensor of claim 4 wherein each of the additional plurality of magnetic layers adjoins a nonmagnetic layer of the at least one nonmagnetic layer.

7. The touchdowns sensor of claim 1 wherein the plurality of magnetic layers include at least one of Ni, Co, NiFe, NiFeCr, CoNiFe, and CoFe.

8. The touchdown sensor of claim 1 wherein the TCR is at least 0.3%/° C.

9. The touchdown sensor of claim 1 further comprising:
   a seed layer, the sensor layer residing on the seed layer; and
   a capping layer on the sensor layer.

10. The touchdown sensor of claim 9 wherein seed layer includes at least one of Ta, Ru, Ti, NiNb, and NiCr.

11. The touchdown sensor of claim 9 wherein capping layer includes at least one of Ta, Ru, Ti, NiNb, and NiCr.

12. The touchdown sensor of claim 1 wherein the at least one nonmagnetic layer includes an insulator.

13. The touchdown sensor of claim 12 wherein the insulator is aluminum oxide.

14. The touchdown sensor of claim 1 wherein the at least one nonmagnetic layer includes a metal.

15. The touchdown sensor of claim 14 wherein the metal includes Ru.

16. The touchdown sensor of claim 1 wherein the plurality of magnetic layers includes two magnetic layers and the at least one nonmagnetic layer is a single nonmagnetic layer.

17. The touchdown sensor of claim 1 wherein the plurality of magnetic layers includes three magnetic layers and the at least one nonmagnetic layer includes two nonmagnetic layers.

18. A touchdown sensor comprising:
   a Ta seed layer;
   a sensor layer within the touchdown sensor, the sensor layer on the Ta seed layer, the sensor layer including a plurality of magnetic layers interleaved with at least one nonmagnetic layer, the plurality of magnetic layers having a plurality of magnetic moments that are antiferromagnetically coupled, have a fixed relative orientation and are single domain, the plurality of magnetic layers includes at least one of Ni, Co, and NiFe, the at least one nonmagnetic layer being Ru, the sensor layer having a temperature coefficient of resistivity (TCR) of at least 0.3%/° C.; and
   a Ta capping layer on the sensor layer.

19. A magnetic recording disk drive comprising:
   at least one disk;
   at least one slider including at least one magnetic head, the at least one magnetic head having a touchdown sensor, the touchdown sensor having a sensor layer including a plurality of magnetic layers interleaved with at least one nonmagnetic layer, the plurality of magnetic layers having a plurality of magnetic moments that are magnetically coupled, are single domain, and have a fixed relative orientation, the sensor layer having a temperature coefficient of resistivity (TCR) of at least 0.15%/° C.

* * * * *